United States Patent
Venier

[19]

[11] Patent Number: 5,771,337
[45] Date of Patent: Jun. 23, 1998

[54] CELL FOR ELECTRONIC DIFFUSION NETWORK MAKING IT POSSIBLE TO CREATE RECEPTIVE FIELDS IN PSEUDO-AXONAL NETWORKS AND NETWORK APPLYING SAME

[75] Inventor: Philippe Venier, Grenchen, Switzerland

[73] Assignee: Centre Suisse D'Electronique et de Microtechnique SA, Neuchatel, Switzerland

[21] Appl. No.: 667,822

[22] Filed: Jun. 20, 1996

[30] Foreign Application Priority Data

Jun. 23, 1995 [FR] France ................................ 95 07578

[51] Int. Cl.[6] .............................................. G06F 15/18
[52] U.S. Cl. ............................................. 395/27; 395/24
[58] Field of Search ....................................... 395/24, 27

[56] References Cited

U.S. PATENT DOCUMENTS

| | | | |
|---|---|---|---|
| 5,053,645 | 10/1991 | Harada | 395/27 |
| 5,218,440 | 6/1993 | Mathur | 395/24 |
| 5,361,328 | 11/1994 | Takatori | 395/24 |
| 5,530,953 | 6/1996 | Nagazumi | 395/27 |

FOREIGN PATENT DOCUMENTS 0517097  12/1992  European Pat. Off. .

OTHER PUBLICATIONS

"Generation of learning neighbourhood in Kohonen feature meps by means of simple nonlinear network", Electronic Letters, vol. 27, No. 3, Jan. 1991, pp. 275–277.

"Design of a half–toning integrated circuit based on analog quadratic minimization by non linear multistage switched capacitor network", IEEE International Symposium on Circuits and.

Pascal Heim, "cmos analogue vlsi implemetation of a kohonan map," These no 1174, Ecole polytechnique federale de lausanne, Lausanne (EPFL, Switzerland), Dec. 1993.

*Primary Examiner*—Allen R. MacDonald
*Assistant Examiner*—Jeffrey S. Smith

[57] ABSTRACT

A cell for an electronic diffusion network that can be connected with neighboring cells for the transmission of information via linking elements (8n, 8rn, 8sn) having a nonlinear conduction characteristic. The cell also includes a connection node (1n) whose potential is representative of the excited state of the cell and to which is linked at least one of the linking elements (8n). The connection node (1n) is inserted into a series circuit which includes a current source (3n) and a current consuming element (5n) so as to fix the potential of the node (1n) to which the current source (3n) is connected by way of a switch element (2n) that has selective closure with the aid of activation pulses. A network equipped with such cells can assign both a temporal parameter and a quantitative parameter to the information diffused.

11 Claims, 8 Drawing Sheets

CELL FOR ELECTRONIC DIFFUSION NETWORK MAKING IT POSSIBLE TO CREATE RECEPTIVE FIELDS IN PSEUDO-AXONAL NETWORKS AND NETWORK APPLYING SAME

FIELD OF THE INVENTION

The present invention relates to electronic diffusion networks making it possible to create receptive or projective fields, according to a principle which attempts to imitate what takes place in the nervous system of living beings. This is why specialists in this area sometimes refer to these networks as "pseudo-axonal trees".

Such networks serve to create systems in which each cell of an axonal tree makes it possible to communicate with a large number of selected cells from another group (or "layer"), the number of cells of this other layer of cells being determined by the actual topology of this axonal tree.

One area of application of such networks employing axonal pseudo-neural trees is that of character recognition.

BACKGROUND OF THE INVENTION

A network of this type was described from an essentially theoretical standpoint in Chapter 5 of a thesis submitted in 1993 to the Ecole Polytechnique Federale de Lausanne (EPFL, Switzerland) by P. Heim, entitled: "Nonlinear Diffusion Network for Neighbourhood Generation".

The network examined in this document includes layers composed of cells which, in each layer, are laterally connected together by way of linking elements termed "RG" (standing for resistance-conductance) preferably having a nonlinear conduction characteristic, and which typically are transistors.

Each cell exhibits a connection node into which a current can be injected which is able to propagate laterally in the layer towards the neighboring cells through the corresponding RG elements. The cells thus reached by this control pulse form, within the layer, a configuration of circular shape, referred to as a "bubble" by specialists.

Thus, in a system composed of several layers of cells, each cell of an transmitter layer can be connected by its own axonal tree to the cells of a receiver layer and can propagate information materialized from currents injected into the cells through the conduction elements.

The extent of a bubble in the layer (that is to say the number of activated cells making up the bubble), depends firstly on the strength of the current injected. In the aforesaid article means are proposed for diffusing the current uniformly within the layer so as to obtain a bubble shape which is essentially circular, irrespective of the place in the network at which the current is injected.

The purpose of the invention is to provide a cell intended to form the basic element of a distribution network of the "neuronal pseudo-axonal tree" type and which, based on the principles set out in the aforesaid document by P. Heim, makes it possible to construct such a network in a simple and efficient manner, while also improving its performance, in particular as regards the ability to generate bubbles with nonuniform dimensions.

The subject of the invention is therefore primarily a cell for a pseudo-axonal information diffusion network in which the cells are connected together for the transmission of information via linking elements having a nonlinear conduction characteristic, said cell including a connection node whose potential is representative of the excited state of said cell and to which is linked at least one of said linking elements, said connection node also being inserted into a series circuit which includes a current source and a current consuming element so as to fix said potential, said cell being one in which said current source is connected to said connection node by way of a switch element having selective closure by activation pulses.

It follows from these features that the elementary information item required to be processed by the cell can be a control or activation pulse which by closing the switch element causes the temporary injection of a current into the connection node of the cell, so as to communicate the information item represented by said activation pulse to the nodes of preselected neighboring cells of the network, in the form of temporary currents passing through the linking elements between these cells and drawn off from the injected current.

Thus, the information to be diffused can be endowed not only with a quantitative aspect via the strength of the current injected, but also with a temporal aspect, the latter being represented either by the duration of the control pulse, or else more advantageously, by the frequency of the control pulses applied to a relevant cell. In the latter case, the information item delivered by a given cell may be formed by an accumulation of the elementary information items delivered respectively on each appearance anywhere in the network of a control pulse capable of causing the excitation of the relevant cell.

The subject of the invention is also an information diffusion network employing cells of the type defined above.

BRIEF DESCRIPTION OF THE DRAWINGS

Other features and advantages of the invention will emerge in the course of the description which follows, given merely by way of example and made with reference to the appended drawings in which:

FIG. 1 is a functional diagram of a cell for a two-dimensional pseudo-axonal diffusion network designed according to the invention;

FIG. 2 is the diagram of a concrete embodiment of a network cell according to FIG. 1;

FIG. 4 represents very symbolically a part of a network, of the hexagonal type with large dimensions, constructed according to the invention, from the basic diagram represented in FIG. 3;

FIG. 6 represents the diagram of a one-dimensional and unidirectional network also employing simplified cells according to the invention;

FIG. 7A shows the diagram of a concrete embodiment of a cell employed in the network of FIG. 6;

FIG. 7B shows the concrete diagram of an example cell for a hexagonal network of the type of FIGS. 2 and 3 and including means making it possible to block the diffusion in a given direction of diffusion;

FIG. 8 represents symbolically the very simplified diagram of a diffusion system embodied with the aid of cell networks designed according to the invention; and FIGS. 9A to 9E show, by way of example, several illustrations of the operation of a part of a two-dimensional network according to the invention.

DESCRIPTION OF THE PREFERRED EMBODIMENTS

Represented in FIG. 1 is the preferred embodiment of the cell Cn for a network according to the invention. The cell Cn defines a node 1n to which are connected
- a switch 2n linked moreover through a current source 3n to a line 4 joined to a power source (not represented);
- a transistor 5n linked to ground 6 which is the other pole of the power source, this transistor being a consuming element which biases the node 1n;
- the noninverting input of a comparator 7n; and
- the respective terminals of three linking elements 8n, 8rn and 8sn, of RG type (resistance/conductance) belonging respectively to the relevant cell n and intended to be connected to neighboring cells of the network. For example, the RG element 8n is connected to node 1n–1 of cell Cn–1.

The inverting input of the comparator 7n is linked to a source 9 delivering a threshold voltage Vth.

The RG elements 8n, 8rn and 8sn may be straightforward ohmic resistors; however, as represented, they are formed, preferably, by MOS transistors which make it possible to generate noncircular bubbles in the network. Indeed, the voltages Vr1, Vr2 and Vr3 applied respectively to the gates of the MOS transistors 8n, 8rn and 8sn may differ from one another. Thus, the direction of propagation of the currents may be chosen along the three possible directions defined by the network.

The comparator 7n delivers a signal on the output 10n of the cell depending on the result of the comparison between the threshold voltage Vth and the potential of the node 1n. As will be seen below, this output can be connected to one or more other cells of the network which together with the cell Cn make up a pseudo-axonal tree, for example. However, it can also be linked to an application circuit (not represented), such as a charge accumulation device, a pulse counter or else a frequency/voltage or current converter delivering a useful signal which is representative of the temporal behavior of the cell in question.

In FIG. 1, the diagram drawn with bold lines represents a cell intended to form part of a two-dimensional network. However, a less complex one-dimensional network may be built with the same cells by omitting the connections to cells 8rn and 8sn.

As already noted, two-dimensional configurations can form groups of cells which can be regarded as constituting layers, connected to neighboring layers by way of connections between the outputs and the nodes of the cells. However, it will be understood that the notion of "layer" should not be understood as if the cells were actually arranged in physically overlaid layers, it being possible to convey this notion only by the electrical connections between the nodes of the cells and the outputs of the latter. In reality, a complex network with several layers could therefore physically be planar and be embodied in the form of one or more integrated circuit chips for example.

As may be noted on examining FIG. 1, according to an important feature of the invention, the node 1n of cell Cn is connected to the current source 3n through the switch 2n, the latter being controlled by way of a control line 11n to which may be applied a cell activation signal In in the form of a current pulse or of several successive current pulses depending on the information item which it is wished to distribute around the network. This point will be explained in greater detail later in the rest of the description.

Reference will now be made to FIG. 2 which represents a concrete embodiment of a cell according to the invention.

The cell comprises a first series circuit connected between the power source 4 and ground 6. Three transistors M1, M2 and M3 are inserted into this series circuit. The transistor M1 forms the current source 3n. Its gate voltage is applied to it by a control line 12. The transistor M2 determines the potential of the node 1n, a voltage Vu being applied for this purpose to its gate through a control line 13. The transistor M3 constitutes the switch 2n, its gate being connected to the control line 11n.

The cell also comprises a second series circuit into which are inserted the transistors M4 and M5 together constituting the comparator 7n. The output 10n of the cell is drawn from the node between these two transistors. The threshold voltage Vth is applied to the gate of the transistor M4 by way of a line 14. The gate of the transistor M5 is connected to the node 1n.

The elements 8n, 8rn and 8sn are formed by respective transistors M6a, M6b and M6c whose source-drain circuits are inserted between the node 1n of the relevant cell and the equivalent transistors of three neighboring cells. The gates of these transistors M6a, M6b and M6c are joined to respective control lines 15a, 15b and 15c to which the control voltages Vr1, Vr2 and Vr3 are applied, and whose role will emerge subsequently.

Figure 3:
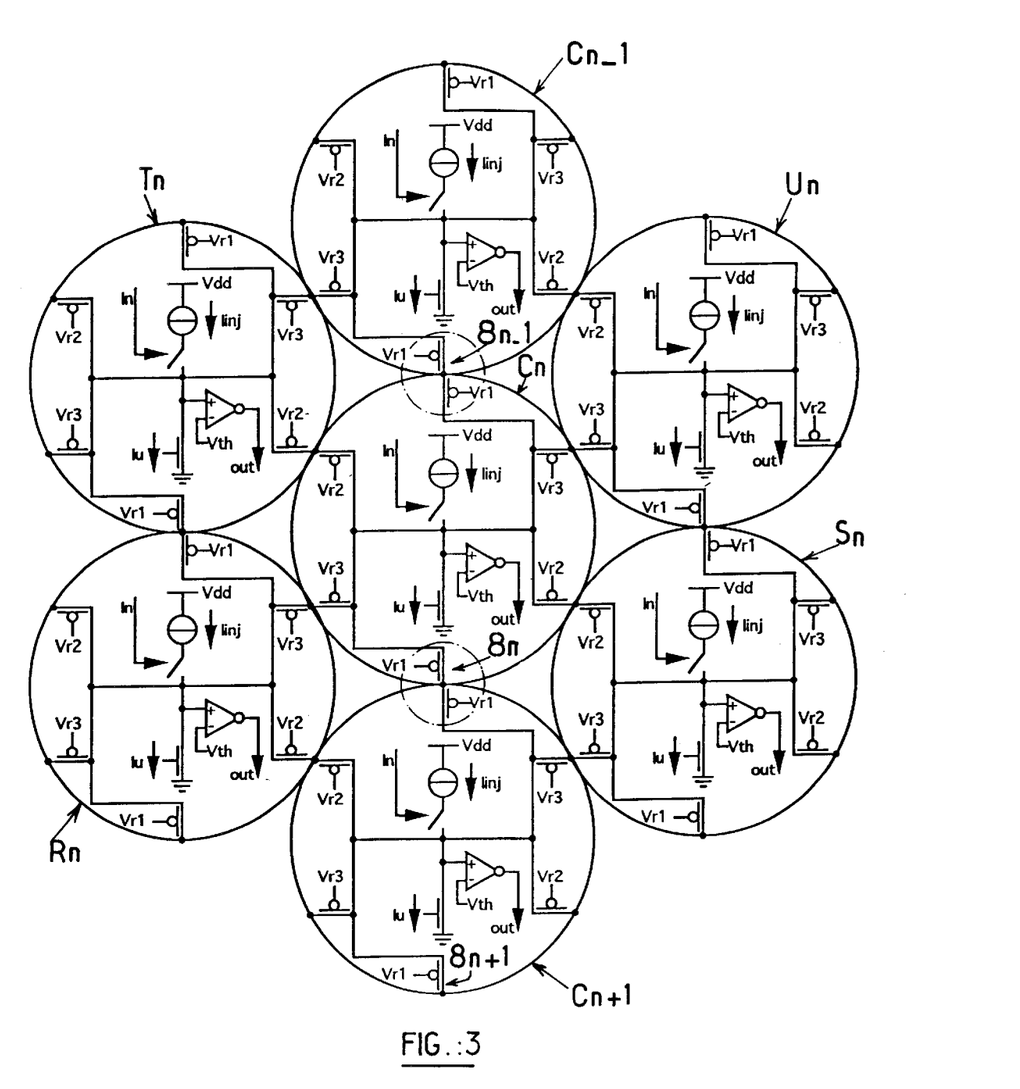
FIG. 3 is a diagram of a few cells of a two-dimensional network according to the invention, composed of cells such as those represented in FIGS. 1 and 2.

FIG. 3 represents in greater detail a part of a hexagonal diffusion network, each cell of this network being surrounded by a symbolic circle which delimits it with respect to the other cells. Thus, the figure represents cells Cn, Cn–1, Cn+1, Rn, Sn, Tn and Un. These cells are connected to one another by RG elements, such as 8n, 8n–1, 8rn and 8sn for example belonging respectively to two contiguous cells. In this configuration, the cells are therefore strictly identical. It will be observed that the control voltages applied to these RG elements are the same along the diagonals of the network. For example, the transistors which link together the cells Cn–1, Cn and Cn+1, the cells Tn and Rn and the cells Un and Sn respectively, are controlled by the same voltage Vr1, whereas the transistors which link together the cells Un, Cn, Sn, the cells Cn–1 and Un and the cells Rn and Cn+1 are controlled by the voltage Vr2 respectively, etc.

FIG. 4 repeats and multiplies up the diagram of FIG. 3 in order to illustrate the construction of a part of a hexagonal two-dimensional network of very large dimensions, only the cell Cn being detailed separately in the circle labeled 19. This part comprises 45 cells. In practice, such a network may include several thousand cells. The hexagonal arrangement exhibits a considerable technological advantage in that it makes it possible to obtain a maximum cell density within one and the same layer without it being necessary to provide crossovers of the interconnections of the cells.

Figure 5:
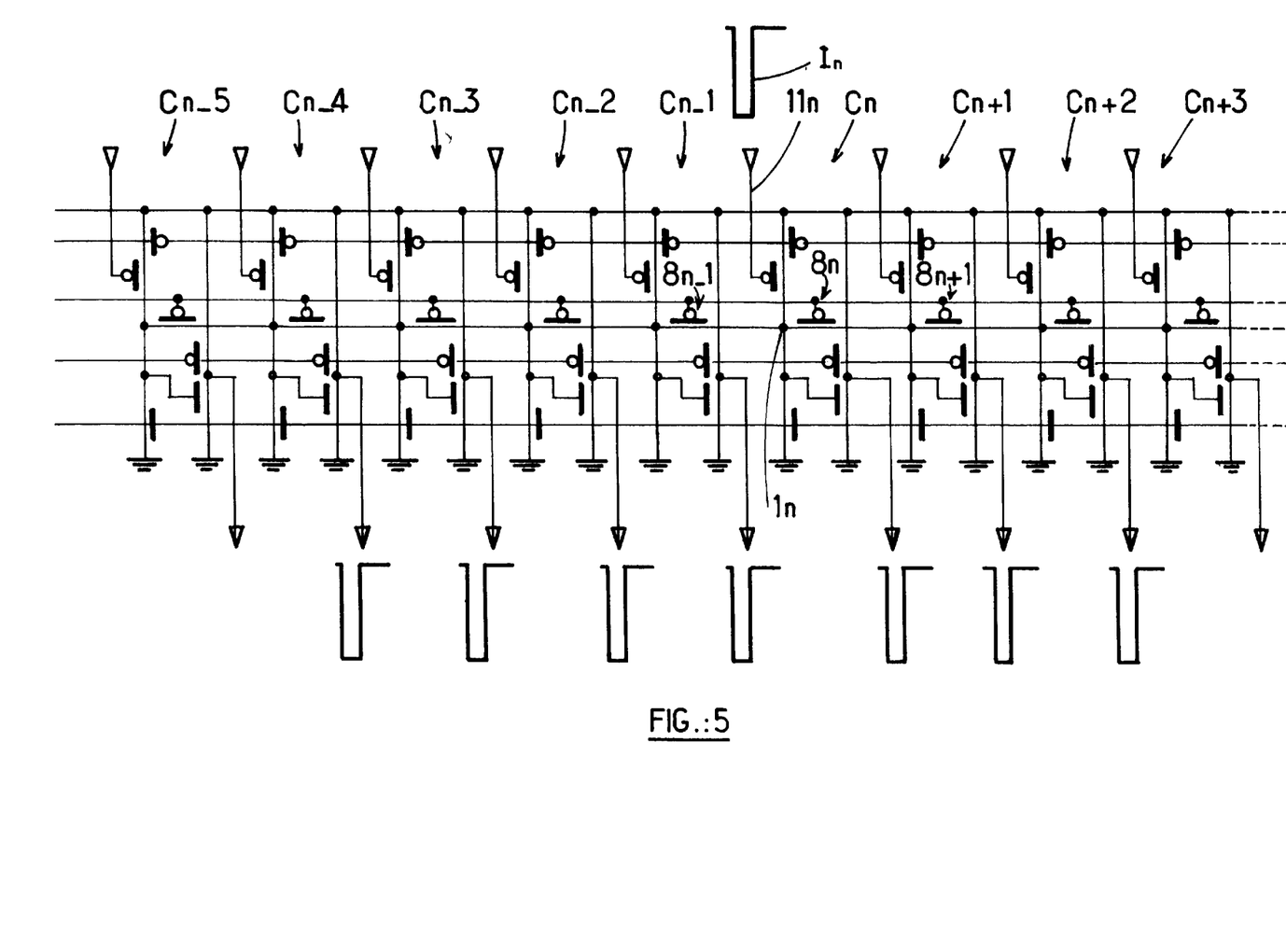
FIG. 5 represents the diagram of a one-dimensional network employing simplified cells according to the invention.

FIG. 5 shows a one-dimensional diffusion network in accordance with the invention and embodied with the aid of cells such as that represented in FIGS. 1 and 2 with the difference that they are simplified by including just one RG element leading to the neighboring cell and therefore of course just one control line for applying the control voltage.

This FIG. 5 shows nine cells labeled Cn–5 to Cn+3, cell Cn being assumed to receive a control pulse In on its control line 11n.

It can be seen that the ratio of currents Iinj and Iu (see FIG. 1) flowing on either side of the node 1n determines firstly the number of cells which will be activated on each side of the cell Cn receiving the activation pulse In. In other words, this ratio determines the number of cells in which the current injected into the node 1n will be able to generate a potential sufficient to trigger the comparator of a cell. In the case represented, it has been assumed that this ratio is equal to seven, since, as may be seen in FIG. 5, the cells Cn−4 to Cn+2 produce a pulse at their output. Hence, here the "bubble" over which the information item represented by the pulse applied to the cell Cn diffuses is regarded as having an extent of seven cells. As this extent depends on the current ratio Iinj/Iu, it may be observed that it is determined in reality and firstly by the ratio of the voltages applied respectively to the lines 12 and 14 (see FIG. 2).

FIG. 6 represents a one-dimensional network composed of simplified cells according to the invention, this network being furnished moreover with means for determining the direction of propagation of the information in the network. In other words, this network can, by choice, be rendered unidirectional in each direction in terms of information propagation.

For this purpose, a switch element . . . $16n−1$, $16n$, $16n+1$ . . . , formed preferably by a switching transistor, is inserted in series with the RG element . . . $8n−1$, $8n$, $8n+1$ . . . of each cell. The control gate of this switch element is connected to the line . . . $11n−1$, $11n$, $11n+1$ . . . of the corresponding cell by way of an inverter . . . $17n−1$, $17n$, $17n+1$ . . . .

Consequently, as soon as a cell, for example the cell Cn of FIG. 6, receives a current pulse on its line $11n$, its switch element $16n$ is also operated, blocking the network on this side (see the left of the FIG. 6). The current pulse can therefore propagate in one direction only (towards the right in FIG. 6).

The degree of shifting of the information in the network (the number of cells simultaneously affected by the control or activation pulse) is here also determined by the ratio between the currents Iinj and Iu of the cell receiving the control pulse. In the example represented, the ratio is four so that the shift is 4−1=3, the cell Cn+3 therefore being the last to be affected by the control pulse. In other words, the "bubble" extends over four cells. In practice, the network will include a much larger number of cells. Thus, if, by way of example, this network includes 100 cells, if the comparators $7n$ of the cells toggle for a voltage of the node $1n$ corresponding to a current Iu of 2 nA and if the current injected into the node of the cell receiving the control pulse is 100 nA, the "bubble" will extend over fifty cells of the network.

FIG. 6 reveals another advantageous feature according to the invention which consists in the possibility of making a signal appear at the output of only the last cell which is required to be activated in order to diffuse the information.

For this purpose, each cell is equipped with a NAND gate . . . $18n−1$, $18n$, $18n+1$ . . . one of whose inputs is connected to the output . . . $10n−1$, $10n$, $10n+1$ . . . of the corresponding cell and to the other input of the NAND gate of the preceding cell.

Thus, a signal appears at the output of a cell only if the latter is itself activated, simultaneously with the preceding cell. This amounts to a single signal appearing at the output of the network (in this instance at the output of cell Cn+3).

FIG. 7A shows a concrete embodiment of a simplified cell employed in the network according to FIG. 6, the diagram of the NAND gate $18n$ not being represented there. This cell is provided with just one transistor M6 forming an RS element, given that it is intended to form part of a one-dimensional network. It can be seen that the switching transistor $16n$ and the inverter $17n$ of FIG. 6 are embodied with the aid of respective transistors M7, M8 and M9.

FIG. 7B shows a similar diagram for a cell intended for a two-dimensional network with the possibility of blocking the diffusion of information in a given direction of diffusion.

FIG. 8 represents symbolically an example application of a combination of unidirectional one-dimensional networks on the one hand and of two-way networks on the other hand, which have just been described above. This is a diffusion system comprising two networks R1x and R2x in the direction X and two networks R1y, R2y in the direction Y, respectively, these networks being constructed according to the diagram of FIG. 6. Furthermore, the system includes two two-dimensional networks CR1 and CR2 according to FIGS. 3 and 4.

This system can include a very large number of cells, for example several thousand. The assembly represented thus constitutes a diffusion system making it possible to generate receptive fields depending on the activation of the cells in each two-dimensional network, it being possible for one to be excitatory and the other inhibitory. The four one-dimensional networks R1x, R2x, R1y and R2y are capable of generating a shift between the position of a target cell Cn and the center of the excitatory or inhibitory part of the receptive field.

Thus, the system of FIG. 8 is capable of generating receptive fields comparable to those of the cells of the visual cortex, including the simple cells, the complex and hyper-complex cells and the contour cells.

FIGS. 9A to 9E illustrate the operation of a two-dimensional diffusion network of the type described with regard to FIGS. 3 and 4 and which implements the features of the invention.

In these figures which represent just a small portion of such a network, each cell is represented by a circle. Furthermore, indicated in FIG. 9A by voltage vectors Vr1, Vr2 and Vr3 are the directions in which these voltages act in the network by activating the transistors for communicating with the neighboring cells.

Finally, in each of these figures it is assumed that at the relevant instant, an injection cell CC of the network is activated by a current pulse. Of course, this cell may (or may not) differ on each activation pulse depending on the place at which this pulse is applied to the network.

This being so, in FIG. 9A, the ratio Iinj/Ii applied to the injection cell CC is for example equal to 21, a value which is chosen here merely by way of example. Furthermore, the voltages Vr1 and Vr2 are chosen to have equal values, whereas the voltage Vr3 is equal to zero. Thus, the current pulse spreads through the network from the injection cell and activates all the cells round about for which the control voltages have enabled communication with the respective neighboring cells and for which, simultaneously, the current corresponding to the share or shares of the activation pulse which returns(return) to them, is(are) sufficient to cause the triggering of their comparator $7n$. As a result of this, the shape of the "bubble" (the configuration of all the activated cells in this two-dimensional network) can be determined at will by choosing these parameters accordingly.

Thus, for example, in FIG. 9A the cell CC1 is activated by the voltage Vr1, drawing off its share of the current pulse which reaches it directly from the injection cell CC. The cell D4 for example is activated by current shares which reach it from the neighboring cells by virtue of the presence of the voltages Vr1 and Vr2 at the same time.

In FIG. 9B it is assumed that the current ratio Iinj/Ii=19, that Vr1=k*Vr2 with k>1 and that Vr3=0. Under these conditions, with the appearance of the activation pulse, the "bubble" takes on a substantially elongate shape, extending on either side of the activation cell CC.

In FIG. 9c, Iinj/Ii=13 and Vr1=Vr2=Vr3. Furthermore, this network is assumed to be constructed according to the concept illustrated in FIG. 7B. Hence, the cells of the network lying to the left of the injection cell CC (as seen in FIG. 9C) are cut off and receive no share of current.

In FIG. 9D, Iinj/Ii=9, Vr1≠0 and Vr2=Vr3=0. Under these conditions, the "bubble" has a shape corresponding to a row of cells of the network.

Finally, in FIG. 9E, Iinj/Ii=5, Vr1≠0 and Vr2=Vr3=0, while here also the network is designed according to FIG. 7B, the left branch of the injection cell CC being cut off.

These few examples show clearly that the shape and size of the "bubbles" can be determined at each activation by a current pulse, by choosing a given value for the strength of this pulse, as for each of the voltages Vr1, Vr2 and Vr3 enabling communication between the cells.

It should be noted that each output $10n$ of a cell can be connected to an exploitation circuit already mentioned above, such as a charge accumulation device of the capacitor type for example, shown diagrammatically at 20 in FIG. 9A in respect of one D5 of the cells of the network.

The quantity of charge stored in these charge accumulation devices can thus correspond to the number of successive excitations of these cells by the train of successive activation pulses applied to the injection cells of the network. The "weight" of the data item provided by each of the cells will therefore be all the greater the larger the number of times that the current pulses manage to activate it.

In other words, it is possible to assign each cell an activity rate a defined to be k*f, k being a proportionality factor and f the activation frequency of each cell, it being assumed that the activation pulses are generated at regular intervals and that the duration of the pulses is very short relative to the period of the pulsed signal. If the network includes several layers of cells, the activity rate as regards cells in a given layer which are excited by several cells of a hierarchically higher layer can then be regarded as being a=k(f1+f2).

It is thus appreciated that by means of a much reduced number of connections between various layers of a network, the cells of the various layers can communicate with each other by means of a judicious choice of the parameters controlling each cell. In this context, it is important to note that these parameters can be applied to the cells by matrix systems similar to those ordinarily employed for semiconductor memories. Thus, the invention makes it possible to create a true network of pseudo-axonal trees which are capable of processing information elements by combining them according to rules dictated by applying the cell control parameters. More precisely, by virtue of the connection transistors between the cells (such as the transistors $8n$, $8rn$ and $8sn$ of FIG. 1), the diffusion distance between the cells can be conveniently determined and thus information "bubbles" of very diverse shapes can be formed. In a general manner, the invention makes it possible to program the parameters of the receptive field in a diffusion network by simply determining the current ratios in each of its cells.

It will also be noted that the circuit proposed for each cell includes, in its simplest version, only ten transistors so that, by virtue of the invention, one integrated circuit chip of ordinary size can accommodate a network which includes a very large number of cells.

I claim:

1. A pseudo-axonal information diffusion network comprising a plurality of interconnected cells, each of said cells including at least one linking element having a nonlinear conduction characteristic, each for connecting the cell to an adjacent cell of the network, each linking element having a control input for individually varying the conductance of the linking element in response to an applied signal that is independent of the state of any other cell of said network;

a connection node whose potential is representative of the excited state of said cell, said at least one linking element being connected to said node;

a constant current source and a current consuming element connected in a series circuit with said node on either side thereof so as to fix said potential of said node:

a switch connected in series between said current source and said node and being individually controlled by activation pulses.

2. The network as claimed in claim 1 wherein said switch includes a CMOS transistor having a gate connected for receiving said activation pulses.

3. The network as claimed in either one of claims 1 or 2, which further includes a comparator coupled to said node for comparing said potential of said node with a threshold voltage, the output of said comparator delivering output information from said cell.

4. The network as claimed in claim 2 further including a blocking circuit connected in series with one of said at least one linking elements and responsive to said activation pulses to block the connection with the adjacent cell simultaneously with the closure of said switch.

5. The network as claimed in claim 4, wherein said blocking circuit includes a CMOS transistor connected in series with said linking element and having a gate connected to receive said activation pulses.

6. The network as claimed in claim 3, further including a logic gate having one input connected to the output of said comparator and another input connected to the output of a neighboring cell and whose output constitutes the output of the cell.

7. The network as claimed in claims 1 or 2 further including exploitation circuits, and wherein said cells of said network include an output for being coupled to one of said exploitation circuits for generating a signal which is dependent on the rate of excitation of the coupled cell.

8. The network as claimed in claim 7, wherein said exploitation circuit (20) includes a charge accumulation device or a counter.

9. The network as claimed in claims 1 or 2, in which the network is hexagonal and each of said cells other than cells on the periphery of the network includes six linking elements.

10. The network as claimed in claims 1 or 2, in which at least some of said cells include six linking elements connected for forming a hexagonal network and wherein said linking elements are controlled by control voltages which are common along the diagonals of said network.

11. The network as claimed in claim 10, further including rows of cells arranged in pairs along perpendicular axes, the rows corresponding to one and the same axis including blocking means acting respectively in opposite directions.

* * * * *